United States Patent
Wang

(10) Patent No.: US 11,241,625 B2
(45) Date of Patent: Feb. 8, 2022

(54) POSITIONING INFORMATION PROMPTING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Han Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/941,489

(22) Filed: Jul. 28, 2020

(65) Prior Publication Data

US 2020/0353361 A1 Nov. 12, 2020

Related U.S. Application Data

(63) Continuation of application No. PCT/CN2019/079978, filed on Mar. 28, 2019.

(30) Foreign Application Priority Data

May 29, 2018 (CN) .......................... 201810531037.5

(51) Int. Cl.
*A63F 13/65* (2014.01)
*A63F 13/537* (2014.01)
(Continued)

(52) U.S. Cl.
CPC ............ *A63F 13/65* (2014.09); *A63F 13/215* (2014.09); *A63F 13/537* (2014.09); *A63F 13/54* (2014.09)

(58) Field of Classification Search
CPC ......... A63F 13/54; A63F 13/65; A63F 13/537
See application file for complete search history.

(56) References Cited

U.S. PATENT DOCUMENTS

2014/0379108 A1* 12/2014 Vesa ...................... G06F 3/165
700/94
2018/0036636 A1 2/2018 Lee et al.
(Continued)

FOREIGN PATENT DOCUMENTS

CN 104159061 A 11/2014
CN 106154231 A 11/2016
(Continued)

OTHER PUBLICATIONS

Holloway et al., Visualizing Audio in a First-Person Shooter with Directional Sound Display, Jun. 28, 2011. (Year: 2011).*
(Continued)

*Primary Examiner* — James S. McClellan
(74) *Attorney, Agent, or Firm* — Anova Law Group, PLLC

(57) ABSTRACT

This application discloses a positioning information prompting method and apparatus, a storage medium, and an electronic device. The positioning information prompting method includes: obtaining a first position of a first virtual character controlled by an application client in a virtual scene; detecting, in a sound source detection range corresponding to the first position, a sound signal generated in the virtual scene; and displaying positioning information of a sound source of the sound signal in the application client, in a case that the sound signal is detected in the sound source detection range, the positioning information comprising a position mark for marking, in the virtual scene, a second position of the sound source relative to the first virtual character.

19 Claims, 6 Drawing Sheets

(51) Int. Cl.
    *A63F 13/54*           (2014.01)
    *A63F 13/215*         (2014.01)

(56) References Cited

U.S. PATENT DOCUMENTS

| | | | |
|---|---|---|---|
| 2018/0048976 A1 | 2/2018 | Kimura et al. | |
| 2018/0256977 A1 | 9/2018 | Wakasono et al. | |
| 2019/0060758 A1* | 2/2019 | Ge | G06F 3/16 |
| 2019/0099673 A1 | 4/2019 | Shao | |
| 2019/0126151 A1 | 5/2019 | Li | |

FOREIGN PATENT DOCUMENTS

| | | |
|---|---|---|
| CN | 107360494 A | 11/2017 |
| CN | 107469354 A | 12/2017 |
| CN | 107890672 A | 4/2018 |
| CN | 107890673 A | 4/2018 |
| CN | 107992281 A | 5/2018 |
| CN | 108014495 A | 5/2018 |
| CN | 108744516 A | 11/2018 |
| JP | 2017055935 A | 3/2017 |
| WO | 2013114831 A1 | 8/2013 |
| WO | 2016185740 A1 | 3/2018 |

OTHER PUBLICATIONS

The World Intellectual Property Organization (WIPO) International Search Report for PCT/CN2019/079978 Jun. 18, 2019 6 Pages (including translation).

The State Intellectual Property Office of the People's Republic of China (SIPO) Office Action 1 for 201810531037.5 Dec. 4, 2019 12 Pages (including translation).

The State Intellectual Property Office of the People's Republic of China (SIPO) Office Action 2 for 201810531037.5 Apr. 27, 2020 13 Pages (including translation).

Awakening at a Certain Moment, "How far is the gunfire prompt? How many meters are the footsteps? Who knows, please help me out,", Baidu Tieba, Mar. 3, 2018, Retrieved from the Internet:URL: https://tieba.baidu.com/p/5574896592?red_tag=1577874925, [retrieved on Jul. 25, 2020], the whole document 6 pages.

Dangerous Building a Hundred Feet High, "How to judge the position of gunshots in "PUBG Mobile"," Baidu, Jan. 31, 2018, Retrieved from the Internet:URL: http://baijiahao.baidu.com/s?id=1591108375638665962&wfr=spider&for=pc, [retrieved on Jul. 25, 2020], the whole document 6 pages.

Bochao Li, "Aristocratic descent civilian emperor ASUS ROG M6H motherboard review," Zhongguancun online, Jul. 12, 2013, Retrieved from the Internet:URL: http://mb.zol.com.cn/385/3853507.html, [retrieved on Jul. 25, 2020], the whole document 11 pages.

Anonymous, "PlayerUnknown's Battlegrounds stimulate the battlefield minimap icon how to see the minimap detailed introduction," PConline, Feb. 22, 2018, Retrieved from the Internet:URL: https://pcedu.pconline.com.cn/1085/10854644.html?from=bdshare 1/3, [retrieved on Jul. 25, 2020], the whole document 6 pages.

Yangwei, "How to listen to the footsteps of Terminator 2 Wilderness Battle Royale How to identify the source of the sound [multiple pictures]," hackhome.com, Sep. 28, 2017, Retrieved from the Internet:URL: https://www.hackhome.com/InfoView/420861_full.html, [retrieved on Jul. 25, 2020], the whole document 6 pages.

* cited by examiner

POSITIONING INFORMATION PROMPTING METHOD AND APPARATUS, STORAGE MEDIUM, AND ELECTRONIC DEVICE

RELATED APPLICATIONS

This application claims priority to PCT Application No. PCT/CN2019/079978, filed on Mar. 28, 2019, which in turn claims priority to Chinese Patent Application No. 201810531037.5, filed with the National Intellectual Property Administration, PRC on May 29, 2018 and entitled "POSITIONING INFORMATION PROMPTING METHOD AND APPARATUS, STORAGE MEDIUM, AND ELECTRONIC DEVICE." Both applications are incorporated herein by reference in their entirety.

FIELD OF THE TECHNOLOGY

This application relates to the field of computers, and specifically, to a positioning information prompting method and apparatus, a storage medium, and an electronic device.

BACKGROUND OF THE DISCLOSURE

Some application client terminals may simulate and play a sound made by a virtual object in a virtual scene, so that a user who participates in the virtual scene to fulfill a task can hear the simulated sound, thereby achieving a simulation effect.

However, when operating the application client on a mobile terminal, it is difficult to ensure accurate acquisition of positioning information of a target object if a position of the target object that makes the sound in the virtual scene is obtained based only on the simulated sound.

SUMMARY

This application provides a positioning information prompting method and apparatus, a storage medium, and an electronic device, to resolve at least the technical problem that positioning information that is of an object making a sound and that is obtained based only on a simulated sound in a virtual scene is inaccurate.

According to one aspect of the embodiments of this application, a positioning information prompting method is provided. The method includes obtaining a first position of a first virtual character controlled by an application client in a virtual scene; detecting, in a sound source detection range corresponding to the first position, a sound signal generated in the virtual scene; and displaying positioning information of a sound source of the sound signal in the application client, in a case that the sound signal is detected in the sound source detection range, the positioning information comprising a position mark for marking, in the virtual scene, a second position of the sound source relative to the first virtual character.

According to another aspect of the embodiments of this application, a positioning information prompting apparatus is further provided. The apparatus includes a memory and a processor coupled to the memory. The processor is configured to: obtain a first position of a first virtual character controlled by an application client in a virtual scene; detect, in a sound source detection range corresponding to the first position, a sound signal generated in the virtual scene; and display positioning information of a sound source of the sound signal in the application client, in a case that the sound signal is detected in the sound source detection range, the positioning information comprising a position mark, used for marking, in the virtual scene, a second position of the sound source relative to the first virtual character.

According to still another aspect of the embodiments of this application, a non-transitory storage medium is further provided. The storage medium stores a computer program, the computer program being configured to perform, during operations, the foregoing positioning information prompting method.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings.

DESCRIPTION OF EMBODIMENTS

To make a person skilled in the art better understand solutions of this application, the following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. The data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
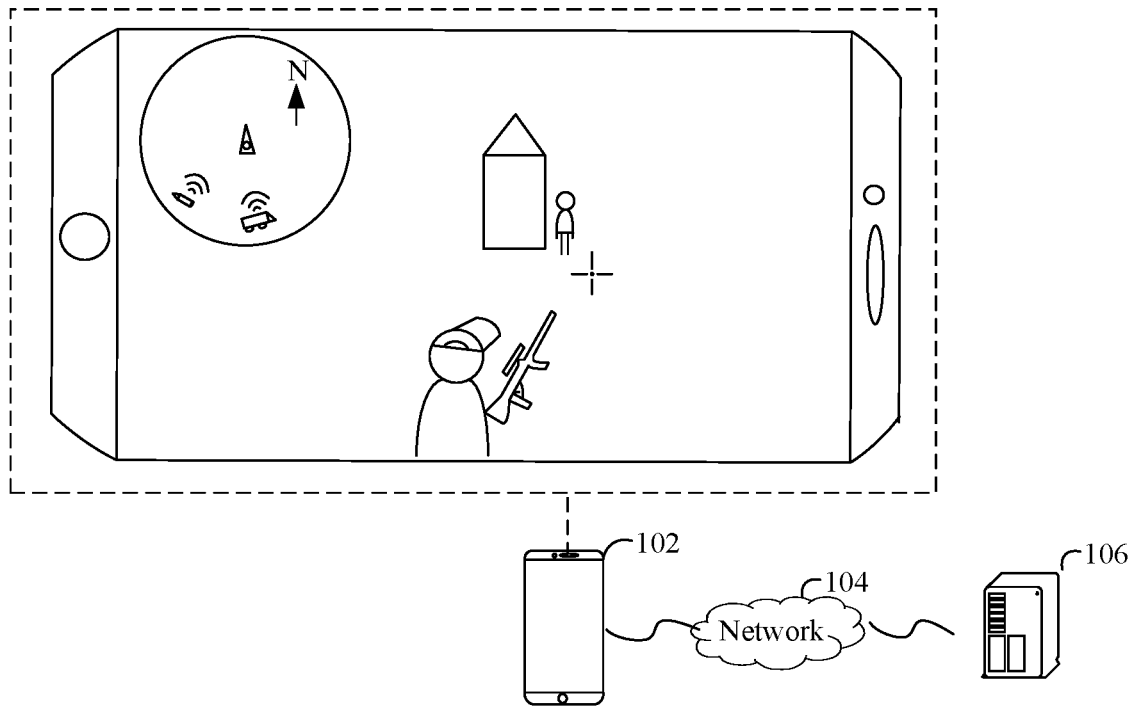
FIG. 1 is a schematic diagram of an application environment of a method for obtaining positioning information according to an embodiment of this application.

According to an aspect of the embodiments of this application, a positioning information prompting method is provided. In some embodiments, the foregoing positioning information prompting method may be applied to, but not limited to an application environment shown in FIG. 1. A terminal 102 and a server 106 perform data exchange with each other through a network 104. The terminal 102 obtains a first position of a first virtual character controlled by an application client in a virtual scene; detects, in a sound source detection range corresponding to the first position, a sound signal generated in the virtual scene; and displays positioning information of a sound source of the sound signal in the application client, in a case that the sound signal is detected in the sound source detection range, the positioning information including a position mark, used for marking, in the virtual scene, a second position of the sound source relative to the first virtual character.

In the related art, during operations of an application client on a mobile terminal, a position of a target object in a virtual scene is usually obtained based on a simulated sound, the target object making the sound. However, because the position that is of the sound making target object in the virtual scene and that is obtained based on the simulated sound is inaccurate, an orientation where the simulated sound comes from and the position are not specific. Consequently, the position that is of the sound making target object in the virtual scene and that is obtained through positioning is inaccurate. However, in this embodiment, by detecting the sound source making the sound in the virtual scene and displaying positioning information of the sound source of the sound signal in a client, the positioning information of the sound source making the sound can be accurately displayed, so that the accuracy of displayed positioning information of the sound source is increased and the problem of low accuracy of obtaining positioning information in the related art is resolved.

Figure 2:
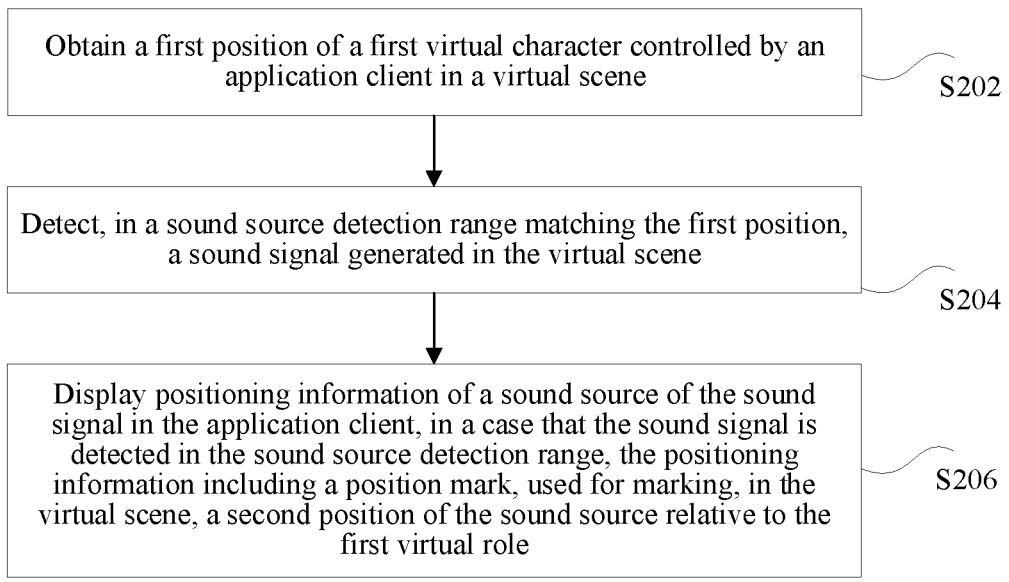
FIG. 2 is a schematic flowchart of an optional method for obtaining positioning information according to an embodiment of this application.

In some embodiments, the foregoing positioning information prompting method may be applied to, but not limited to a terminal that can display a virtual scene, such as a mobile phone, a tablet computer, a laptop, a PC computer, or the like. The network may include, but is not limited to a wireless network or a wired network. The wireless network includes but is not limited to Bluetooth, Wi-Fi, and another network implementing wireless communication. The foregoing wired network may include, but is not limited to: a wide area network, a metropolitan area network, and a local area network. In some embodiments, as shown in FIG. 2, the positioning information prompting method includes the following steps:

S202: Obtain a first position of a first virtual character controlled by an application client in a virtual scene.

S204: Detect, in a sound source detection range corresponding to the first position, a sound signal generated in the virtual scene.

It may be understood that, when the sound signal generated in the virtual scene is detected, it indicates that a sound source making the sound in the virtual scene is detected. The sound source herein is a sound source virtual object. Using a virtual scene in a game as an example, a sound source virtual object is a virtual object that can make a sound, such as a game role, a car, a gun and the like.

For S204, when the application client detects the sound signal in the virtual scene, a signal receiver deployed in different orientations can detect, in the sound source detection range corresponding to the first position, the sound signal generated in the virtual scene.

In an example, corresponding audio signal receivers may be deployed in eight orientations with the first position as a center, including the east, the west, the south, the north, the southeast, the northeast, the southwest and the northwest. The audio signal receiver detects the sound signal generated in the virtual scene. When the audio receiver receives the signal, it indicates that the sound signal is generated in an orientation where the audio receiver is deployed, so that the approximate orientation of the sound source relative to the first virtual character can be positioned.

S206: Display positioning information of the sound source of the sound signal in the application client, in a case that the sound signal is detected in the sound source detection range, the positioning information including a position mark, used for marking, in the virtual scene, a second position of the sound source relative to the first virtual character.

In some embodiments, the positioning information prompting method may be applied to, but not limited to the field of games or the simulation training field. The foregoing positioning information prompting method is described below with reference to the field of games. The foregoing first virtual character may be, but not limited, to a role in a game controlled by a user, and the sound source may be, but not limited, to an object that can make a sound in the game. During the game, when a sound signal is detected in a sound source detection range of the role controlled by the user in the game, positioning information of an object generating the sound signal is displayed in an application client.

Figure 3:
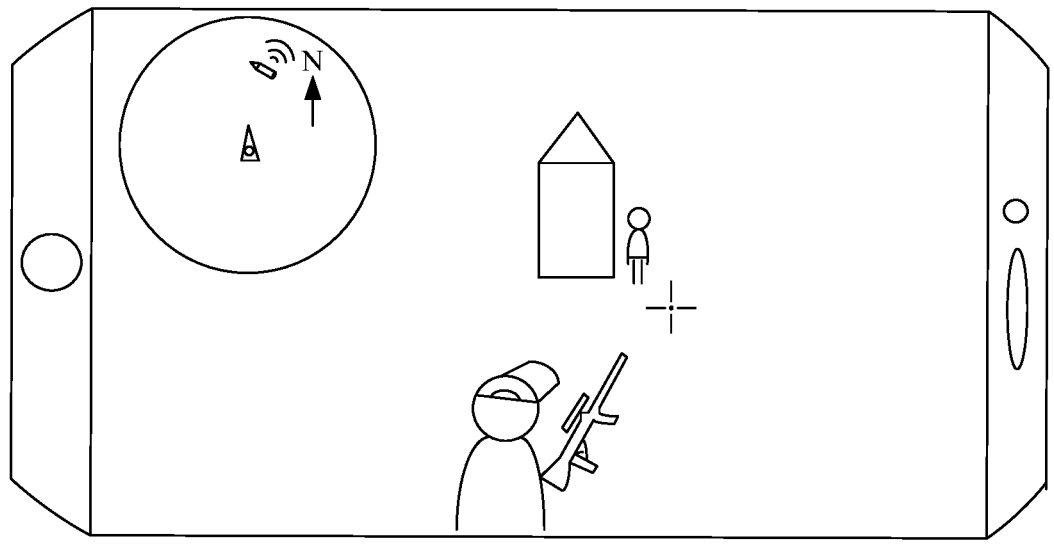
FIG. 3 is a schematic diagram of an optional method for obtaining positioning information according to an embodiment of this application.

For example, descriptions are provided below with reference to FIG. 3. As shown in FIG. 3, a current user is playing a game, a game object controlled by another user near a house in the front is in a sound source detection range of the game object controlled by the current user. After the game object near the house makes a sound (such as a gun sound, a door open and close sound, or a footstep sound), positioning information of the game object near the house is displayed in an application client of the current user, to prompt the current user that there is another game object at a position positioned by the positioning information.

FIG. 3 is merely used for explaining this application, and does not constitute a limitation to this application.

It may be understood that, different types of sound sources generate different sound signals. Therefore, a sound source type of a sound source of a sound signal may also be displayed when information of a position of the sound source of the sound signal is displayed in an application client. The sound source type is distinguishably displayed in a manner such as an icon, to provide more abundant information for the user. Specifically, the displaying positioning information of a sound source of the sound signal in the application client includes: obtaining, from the sound signal, a sound source type of the sound source of the sound signal, and displaying the position mark corresponding to the sound source type, the position mark including a direction mark used for indicating a direction of movement of the sound source relative to the first virtual character.

Figure 4:
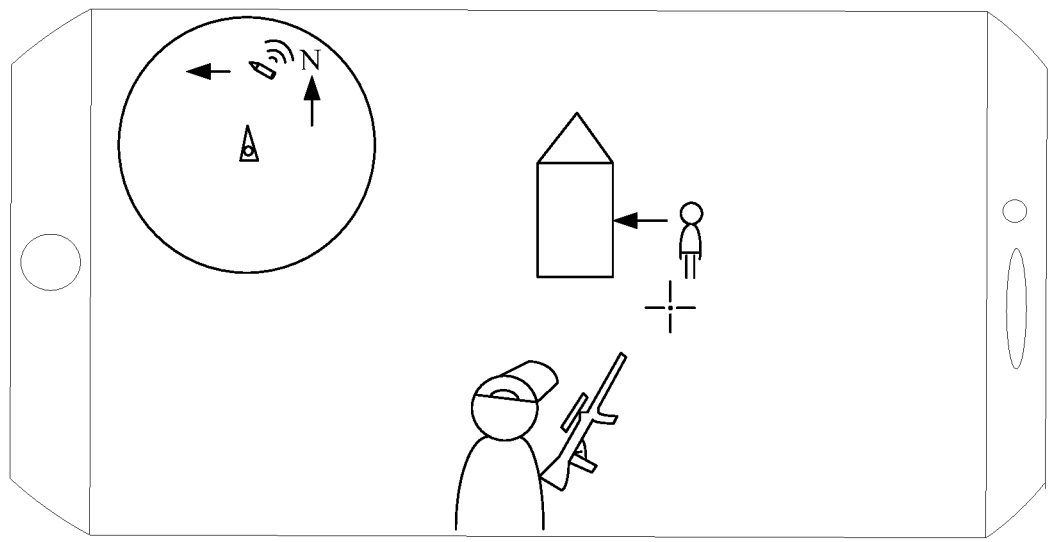
FIG. 4 is a schematic diagram of another optional method for obtaining positioning information according to an embodiment of this application.

For example, descriptions are provided still with reference to the game. As shown in FIG. 4, the current user is playing the game. When the game object controlled by another user is moving toward the house and makes a sound, such as a gun sound or a footstep sound, a direction of movement of the game object controlled by another user needs to be displayed when positioning information of the game object controlled by another user is displayed. As shown in FIG. 4, a bullet identifier is displayed in a map in the upper left corner, the bullet identifier being used for indicating that at a position marked by the bullet identifier, the game object controlled by another user is shooting. There is also an arrow used for indicating the direction of movement of the game object controlled by another user.

The foregoing sound source may not only be the game object controlled by another user, but also may be any game object that can make a sound, such as a car, an airplane, an air-drop, a land mine, or a grenade.

The foregoing arrow indicating the direction of movement of the game object is merely an optional example. Another method may also be used for indicating a direction of movement of a game object. For example, different graphic marks and color marks may be used for indicating a direction of movement of a game object, and a direction in a deep color indicates a direction of movement of a game object, and the like.

In some embodiments, the displaying the position mark corresponding to the sound source type includes at least one of the following: displaying, at the second position of the sound source, the position mark according to a color corresponding to the sound source type; displaying, at the second position of the sound source, the position mark according to a shape corresponding to the sound source type; or displaying, at the second position of the sound source, the position mark according to an identifier corresponding to the sound source type.

The implementation of the displaying the position mark is described below with reference to a specific example. For example, an identifier may be used for indicating a position mark. When a position mark of a sound made by a gun is displayed, a gun identifier or a bullet identifier may be used as the position mark; and when a position mark of a sound made by a car is displayed, a car identifier may be used as the position mark, and the like. Alternatively, a color may be used as a position mark. When a position mark of a sound made by an ally is displayed, the position mark may be a green color, and when a position mark of a sound made by an enemy is displayed, the position mark may be a red color. Alternatively, a shape may be used as a position mark. When a position mark of a sound made by an air-drop is displayed, the position mark may be a triangle, and when a position mark of a sound made by a bomb is displayed, the position mark may be a circle, or the like.

The foregoing position mark being an identifier, a color or a shape is merely an optional example. A specific position mark may be any color, any pattern or a combination thereof.

In some embodiments, before the sound signal generated in the virtual scene is detected, a sound source detection range may be determined. Specifically, a detection radius of the sound source detection range with the first position as a circle center may be determined, according to a preset sound source type, the detection radius being inversely proportional to the frequency of a sound indicated by the preset sound source type. Specifically, a higher frequency of the sound indicated by the preset sound source type indicates a smaller detection radius, and a lower frequency of the sound indicated by the preset sound source type indicates a larger detection radius For example, the field of games is still used as an example for description. Different sound source types correspond to different transmission distances. A transmission distance of a gun sound is larger. As a result, even though a position where the gun sound is made is relatively far from a first virtual object, the sound can be detected. A transmission distance of a door open and close sound is much shorter. Consequently, if the position where the door is opened and closed is slightly farther from the first virtual object, the sound cannot be detected.

Figure 5:
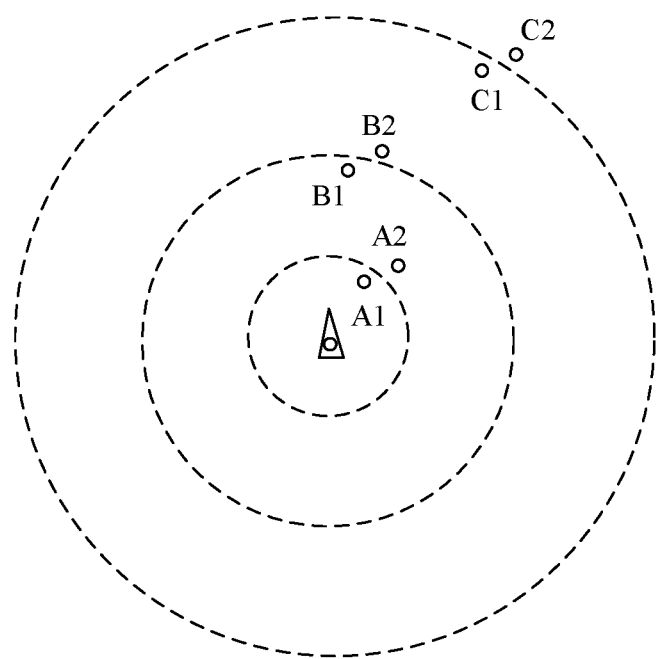
FIG. 5 is a schematic diagram of still another optional method for obtaining positioning information according to an embodiment of this application.

As shown in FIG. 5, A1 and A2 are positions where door open and close sounds are made, and the smallest broken circle in FIG. 5 covers a range in which a door open and close sound can be detected. Therefore, a door open and close sound at the position A1 can be detected, and is displayed in the client of the first virtual object. However, a door open and close sound at the position A2 cannot be detected. Similarly, C1 and C2 are positions where air-drop sounds are made. The largest broken circle in FIG. 5 covers a range in which an air-drop sound can be detected. Therefore, an air-drop sound at the position C1 can be detected, but an air-drop sound at the position C2 cannot be detected. B1 and B2 are positions where gun sounds are made. The broken circle in the middle in FIG. 5 covers a range in which a gun sound can be detected. Therefore, the gun sound generated at the position B1 can be detected, but a gun sound generated at the position B2 cannot be detected.

A detection radius of a sound source detection range of the first virtual character varies with a sound source type. It may be set that, a smaller frequency of a sound indicated by a sound source type indicates a larger detection radius of the sound source detection range.

Figure 6:
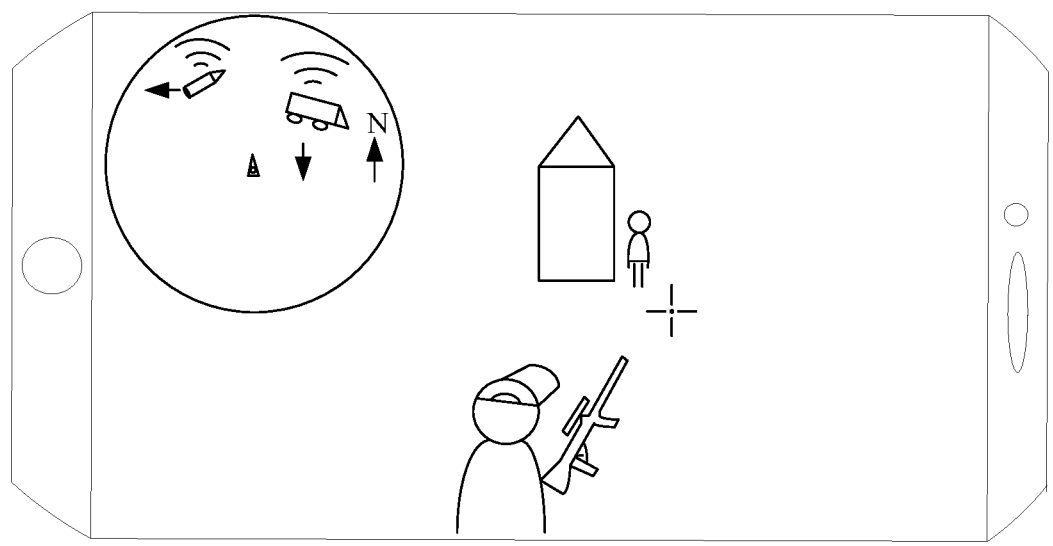
FIG. 6 is a schematic diagram of still another optional method for obtaining positioning information according to an embodiment of this application.

In some embodiments, displaying positioning information of a sound source of the sound signal in the application client may be implemented in the following manners: one implementation is to simultaneously display, in a case that a plurality of sound signals in different directions of a first virtual character are detected in the sound source detection range, position marks corresponding to respective sound sources of the plurality of sound signals; another implementation is to obtain, in a case that a plurality of sound signals in the same direction of the first virtual character are detected in the sound source detection range, display cycles respectively corresponding to sound sources of the plurality of sound signals; and determine a target sound source according to the display cycles, and display the position mark of the target sound source The following descriptions of embodiments of the present disclosure refer to the field of games. As shown in FIG. 6, when a plurality of sound signals are detected, such as a gun sound and a car sound, and position marks of sound sources of the plurality of sound signals need to be displayed on a display interface of a client, the position marks of the gun sound and the car sound are displayed simultaneously if the plurality of sound signals (such as the gun sound and the car sound) are in different directions, and the display result is shown in FIG. 6. If the plurality of the sound signals (such as the gun sound and the car sound) are in the same direction, display cycles respectively corresponding to the gun sound and the car sound are obtained, and the gun sound and the car sound in the same direction are displayed according to the display cycles.

Different display cycles may be set in advance for different sound types. For example, a display cycle of 0.5 s is set for the gun sound, and a display cycle of 1 s is set for the car sound.

In some embodiments, the determining a target sound source according to the display cycles includes: determining the target sound source in the following manner, in a case that a first display start time of the display cycle of a first sound source is earlier than a second display start time of the display cycle of a second sound source: determining the first sound source as the target sound source, in a case that a first display end time of the display cycle of the first sound source is not reached; determining the second sound source as the target sound source, in a case that the first display end time of the display cycle of the first sound source is reached but a second display end time of the display cycle of the second sound source is not reached; and determining the first sound source and the second sound source as alternating target sound sources at predetermined time intervals, in a case that the first display end time of the display cycle of the first sound source is not reached, a display time length of the position mark of the first sound source is greater or equal to a first threshold, and the second display end time of the display cycle of the second sound source is not reached, the first sound source and the second sound source being two different sound sources among the sound sources of the plurality of sound signals.

Figure 7:
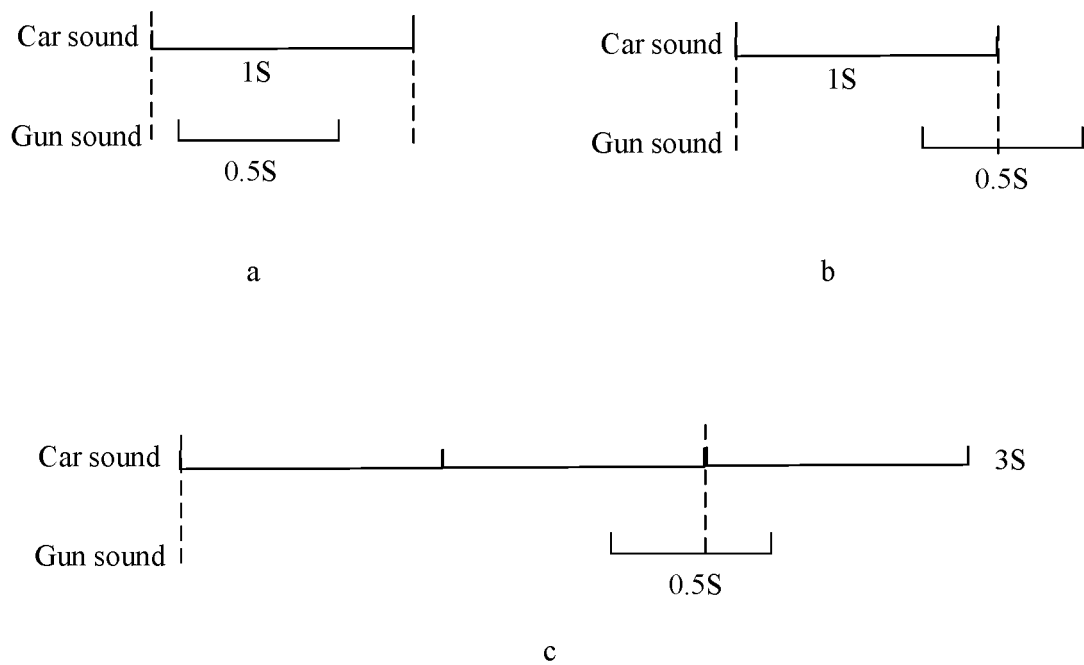
FIG. 7 is a schematic diagram of still another optional method for obtaining positioning information according to an embodiment of this application.

The following descriptions of embodiments of the present use computer game as an example. FIG. 7 shows different display cycles of different sound source types and specific display polices when a plurality of sound sources are in the same direction. As shown in FIG. 7a, a gun sound and a car sound are in the same direction, a display cycle of a position mark corresponding to the car sound is 1 s, and a display cycle of a position mark corresponding to the gun sound is 0.5 s. Because the display cycle of the position mark corresponding to the gun sound is totally in the display cycle of the position mark corresponding to the car sound, the display cycle of the position mark corresponding to the gun sound has not been displayed when the position mark of the car sound starts to be displayed, and the display cycle of the position mark corresponding to the gun sound has already been finished when display of the position mark of the car sound is finished. Therefore, merely the position mark of the car sound is displayed, and the position mark of the gun sound is not displayed. As shown in FIG. 7b, a display cycle of a position mark corresponding to a car sound is 1 s and a display cycle of a position mark corresponding to a gun sound is 0.5 s. The display cycle of the position mark corresponding to the gun sound is not finished when the display cycle of the position mark corresponding to the car sound is finished. As a result, the position mark of the gun sound starts to be displayed after display of the position mark of the car sound is finished. As shown in FIG. 7c, a display cycle of a position mark corresponding to a car sound is 3 s and a display cycle of a position mark corresponding to a gun sound is 0.5 s. The display cycle of the position mark corresponding to the car sound has not been finished when a display time of the position mark of the car sound exceeds 2 s. At this time, the display cycle of the position mark corresponding to the gun sound has not been finished either. Therefore, the position mark of the car sound and the position mark of the gun sound are displayed alternately.

That is, respective position marks of the sound sources of the plurality of sound signals are simultaneously displayed in a case that a plurality of sound signals are detected in the sound source detection range and sound sources of the plurality of sound signals are in different directions of the first virtual character, and a position mark of one sound source among the plurality of sound sources is sequentially displayed at predetermined time intervals in a case that a plurality of sound signals are detected in the sound source detection range and sound sources of the plurality of sound signals are in the same direction of the first virtual character.

In some embodiments, when positioning information of a sound source of a sound signal is displayed in an application client, a display size of the position mark of the sound source may be further increased, in a case that a distance between the second position of the sound source and the first position of a first virtual character is decreased, so that the position mark of the sound source in the application client is displayed in a trend of getting larger; and the display size of the position mark of the sound source may be decreased, in a case that the distance between the second position of the sound source and the first position of the first virtual character is increased, so that the position mark of the sound source is displayed in the application client in a trend of getting smaller. A user can be prompted whether the position of the sound source is farther from or nearer to the position of the first virtual character by the change trend of the position mark. The user then can control a direction of movement of the first virtual character based on the prompt.

Figure 8:
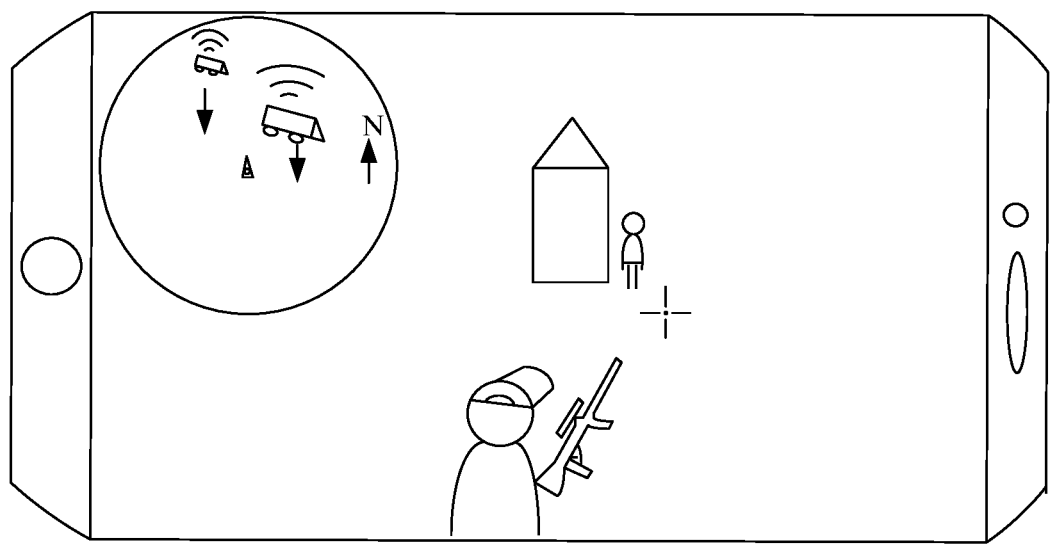
FIG. 8 is a schematic diagram of still another optional method for obtaining positioning information according to an embodiment of this application.

For example, the game application is still used as an example for description. A size of a position mark displayed may be determined by a distance between the first virtual character and a sound source when the position mark is displayed, to illustrate a distance relationship between the first virtual character and the sound source more vividly. As shown in FIG. 8, when position marks of car sounds in different directions are displayed, a smaller mark indicates a relatively long distance, and a larger mark indicates a relatively short distance. A size of a position mark displayed can be adjusted in real time with a change of a distance between a car sound and the first virtual character.

A color may also be used for indicating the distance between the first virtual character and the sound source. For example, a deeper color of a position mark that is of a sound source and that is displayed on a client indicates a shorter distance.

In some embodiments, the displaying positioning information of a sound source virtual object in the application client includes at least one of the following: displaying, in a mission map corresponding to the virtual scene, the position mark of the sound source virtual object of the sound signal; or displaying, in a human-computer interface configured to display the virtual scene, the position mark of the sound source virtual object.

Figure 9:
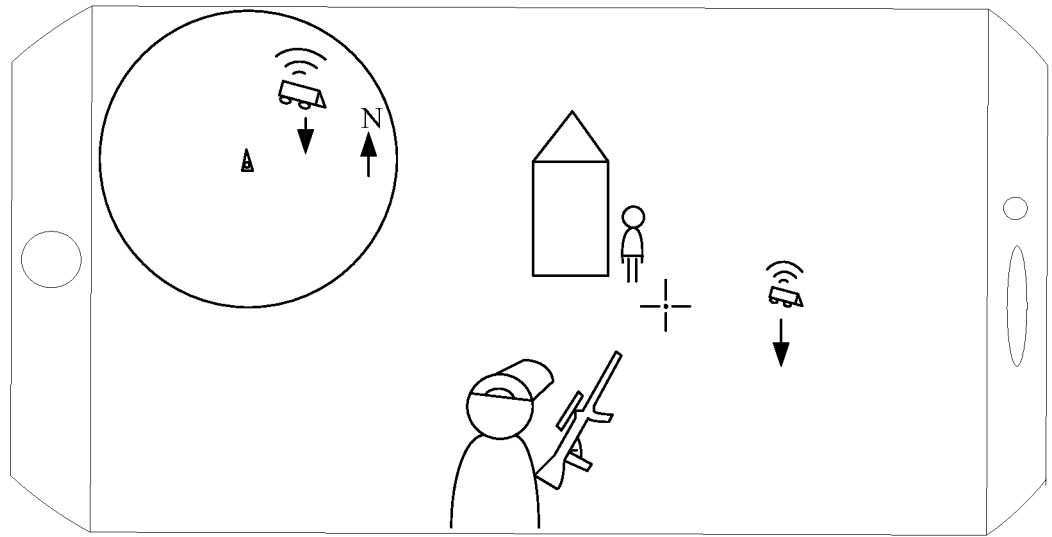
FIG. 9 is a schematic diagram of still another optional method for obtaining positioning information according to an embodiment of this application.

Descriptions are provided still with reference to the foregoing field of games. During the game, when a position mark of a sound source is displayed in the client, the position mark may be displayed not only on a map, but also on a human-computer interface outside the map. As shown in FIG. 9, the position mark may be further displayed beyond a map in the client when the position mark of a sound source virtual object is displayed in the upper left corner of the map in the client. For example, an area may be used as a display area of the position mark.

The position mark may be displayed only in the map in the client, the position mark may be displayed only outside the map on the client, or the position mark may be displayed both in the map and outside the map in the client.

In some embodiments, the displaying positioning information of a sound source of the sound signal in the application client includes: displaying the position mark of the sound source of the sound signal according to the display cycle corresponding to the sound source type of the sound source of the sound signal.

The following descriptions of embodiments of the present disclosure refer to the field of games. When sound source types of sounds made by sound sources are different, display cycles of position marks corresponding to the sound sources are also different. For example, a display cycle of a gun sound is 0.5 s and a display cycle of a position mark corresponding to a door open and close sound is 0.8 s. When a position mark of a sound source virtual object is displayed, the position mark of the sound source of a sound signal may be displayed according to a display cycle corresponding to a sound source type of the sound source of the sound signal.

In some embodiments, a position mark displayed in a client may be preset. For example, descriptions are provided still with reference to the field of games. Position marks of a gun sound and a car sound are preset, with a position mark of a door open and close sound not being displayed. As a result, even though the door open and close sound is detected, the position mark is not displayed. Alternatively, position marks of sounds made by an enemy and an air-drop may be further preset without a position mark of a sound made by an ally being displayed. Then the position mark of the ally is not displayed even though the sound of the ally is detected.

Figure 10:
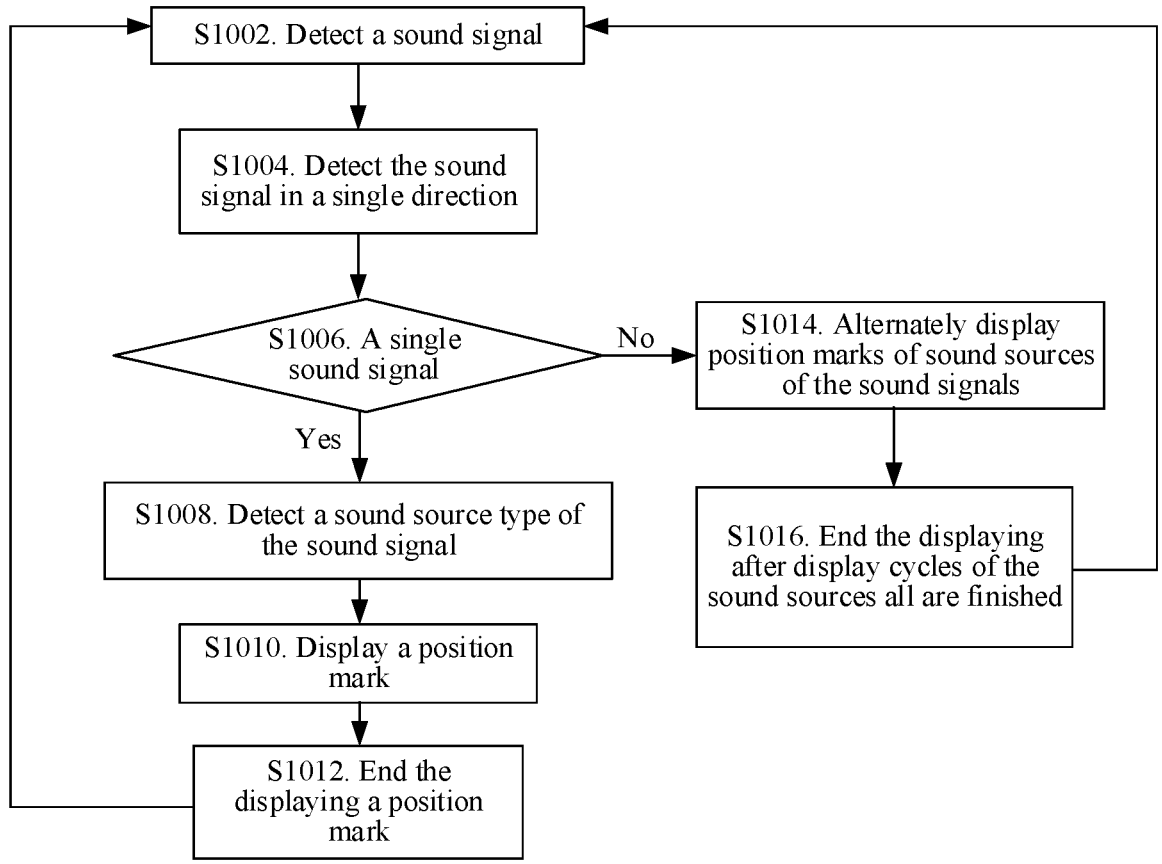
FIG. 10 is a flowchart of another optional method for obtaining positioning information according to an embodiment of this application.

The following is an overall description of the foregoing positioning information prompting method with reference to FIG. 10. The application client detects a sound signal according to step S1002, and after detecting a sound signal from a single direction in step S1004, determines whether the detected sound signal is a single one according to step S1006. When the detected sound signal is a single one, the application client detects a sound source type of the detected sound signal according to step S1008, and performs step S1010 to display a position mark according to the sound source type. After a display cycle of the position mark is finished, the application client performs step S1012 to finish displaying the position mark. When detecting a plurality of sound signals in S1006, the application client performs step S1014 to display position marks of sound sources of the sound signals alternately, and ends the display of the position marks after all display cycles of the sound sources are finished.

According to this embodiment, by obtaining a first position of a first virtual character controlled by an application client in a virtual scene; detecting, in a sound source detection range corresponding to the first position, a sound signal generated in the virtual scene; and displaying positioning information of a sound source of the sound signal in the application client, in a case that the sound signal is detected in the sound source detection range, the positioning information including a position mark, used for marking, in the virtual scene, a second position of the sound source relative to the first virtual character, the positioning information of the sound source making the sound can be accurately displayed, thereby improving the accuracy of displaying the positioning information of the sound source. In this way, the problem in the related art that the obtained positioning information of an object making a sound is low is resolved.

In one embodiment, the displaying positioning information of a sound source virtual object in the application client includes the following steps:

S1: Obtain a sound source type of the sound source of a sound signal.

S2: Display a position mark corresponding to the sound source type, the position mark including a direction mark used for indicating a direction of movement of the sound source relative to the first virtual character.

According to this embodiment, by simultaneously displaying the positioning information of the sound source according to the sound source type and displaying the direction of movement of the sound source relative to the first virtual character, the accuracy of a display position of the sound source is improved.

In one embodiment, the displaying a position mark corresponding to the sound source type includes at least one of the following:

(1) displaying, at the second position of the sound source, the position mark according to a color corresponding to the sound source type;

(2) displaying, at the second position of the sound source, the position mark according to a shape corresponding to the sound source type; or (3) displaying, at the second position of the sound source, the position mark according to an identifier corresponding to the sound source type.

For example, sound source types of sounds generated by different sound sources are different, and therefore, position marks displayed are different. For example, an identifier may be used for indicating a position mark. When a position mark of a sound made by a gun is displayed, a gun identifier or a bullet identifier may be used as the position mark; and when a position mark of a sound made by a car is displayed, a car identifier may be used as the position mark, and the like. Or a color may be used as a position mark. When a position mark of a sound made by an ally is displayed, the position mark may be a green color, and when a position mark of a sound made by an enemy is displayed, the position mark may be a red color. Alternatively, a shape may be used as a position mark. When a position mark of a sound made by an air-drop is displayed, the position mark may be a triangle, and when a position mark of a sound made by a bomb is displayed, the position mark may be a circle.

The foregoing position mark being an identifier, a color or a shape is merely an optional example. A specific position mark may be any color, any pattern or a combination thereof.

According to this embodiment, by providing different position identifiers for different sound source types, different sound source types can be distinguished, to improve the accuracy of displaying a position mark of a sound source.

In one embodiment, before the detecting a sound signal generated in the virtual scene, the method further includes the following steps:

S1: Determine, according to a sound source type, a detection radius of the sound source detection range with the first position as a circle center, the detection radius being inversely proportional to an audio frequency indicated by the preset sound source type.

A detection radius of a sound source detection range of the first virtual character varies with a sound source type. It may be set that, a smaller frequency of a sound indicated by a sound source type indicates a larger detection radius of the sound source detection range.

In this embodiment, by setting different detection radiuses of detection ranges according to different sound source types, the process of detecting the sound source is closer to the real life, thereby further improving the accuracy of displaying a position mark of a sound source.

In one embodiment, the displaying positioning information of a sound source in the application client includes one of the following:

(1) simultaneously displaying, in a case that a plurality of sound signals in different directions of the first virtual character are detected in the sound source detection range, position marks corresponding to respective sound sources of the plurality of sound signals; or (2) obtaining, in a case that a plurality of sound signals in the same direction of the first virtual character are detected in the sound source detection range, display cycles respectively corresponding to sound sources of the plurality of sound signals; and determining a target sound source according to the display cycles, and displaying the position mark of the target sound source.

According to this embodiment, by simultaneously displaying the position marks of the sound sources in different directions, the accuracy of displaying the position mark of the sound source can be improved.

In one embodiment, the determining a target sound source according to the display cycle includes: determining the target sound source in a case that a first display start time of the display cycle of a first sound source is earlier than a second display start time of the display cycle of a second sound source, including:

(1) determining the first sound source as the target sound source, in a case that a first display end time of the display cycle of the first sound source is not reached;

(2) determining the second sound source as the target sound source, in a case that the first display end time of the display cycle of the first sound source is reached but a second display end time of the display cycle of the second sound source is not reached; and (3) determining the first sound source and the second sound source as alternating target sound sources at predetermined time intervals, in a case that the first display end time of the display cycle of the first sound source is not reached, a display time length of the position mark of the first sound source is greater or equal to a first threshold, and the second display end time of the display cycle of the second sound source is not reached.

According to this embodiment, by sequentially or periodically displaying the position marks of different sound sources in the same direction, an objective that even a plurality of sound sources are at the same position, position marks thereof can be displayed, thereby overcoming the difficulty of complex display as well as improving the accuracy of displaying a position mark.

In one embodiment, the displaying positioning information of a sound source in the application client includes:

(1) increasing a display size of the position mark of the sound source, in a case that a distance between the second position of the sound source and the first position of the first virtual character is decreased; and (2) decreasing the display size of the position mark of the sound source, in a case that the distance between the second position of the sound source and the first position of the first virtual character is increased.

A color may also be used for indicating the distance between the first virtual object and the sound source. For example, a deeper color of a position mark that is of a sound source and that is displayed on a client indicates a shorter distance.

According to this embodiment, by determining the size of the position mark according to the distance between a sound source and the first virtual object, the accuracy of displaying a position mark of the sound source can be improved.

In one embodiment, the displaying positioning information of a sound source in the application client includes at least one of the following:

(1) displaying, in a mission map corresponding to the virtual scene, the position mark of the sound source of the sound signal; or (2) displaying, in a human-computer interface configured to display the virtual scene, the position mark of the sound source of the sound signal.

According to this embodiment, by displaying the position mark of the sound source in the map in the client or displaying the position mark of the sound source outside the map, the flexibility of displaying a sound source is improved when the accuracy of displaying the sound source is improved.

In one embodiment, the displaying positioning information of a sound source in an application client may be specifically:

S1: Display a position mark of the sound source of the sound signal, according to a display cycle corresponding to the sound source type of the sound source of the sound signal.

According to this embodiment, by setting different display cycles of position marks for different sound source types, the accuracy of displaying a position mark of a sound source is improved.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this application essentially, or the part contributing to the related art may be implemented in a form of a software product. The computer software product is stored in a storage medium (for example, a ROM/RAM, a magnetic disk, or a compact disc), and includes several instructions for instructing a terminal device (which may be a mobile phone, a computer, a server, a network device, or the like) to perform the methods according to the embodiments of this application.

In embodiments of this application, the first position of the first virtual character controlled by the application client in the virtual scene is obtained. The sound signal generated in the virtual scene is detected in the sound source detection range corresponding to the first position. An orientation of the sound signal can be used as positioning information of the sound source of the sound signal, and the positioning information has relatively high accuracy. The foregoing positioning information is displayed in the foregoing application client, in a form of the position mark of the second position of the sound source relative to the first virtual character, in a case that the sound signal is detected in the sound source detection range, so that a positioning information prompt can be implemented without the need to allocate a large quantity of hardware resources, and the problem that the position of a sound source cannot be obtained due to reasons such as blocked operation can be overcome by displaying the relative position of the sound source, thereby lowering the operational difficulty, and achieving a relatively good technical effect, especially in a mobile terminal such as a mobile phone.

Figure 11:
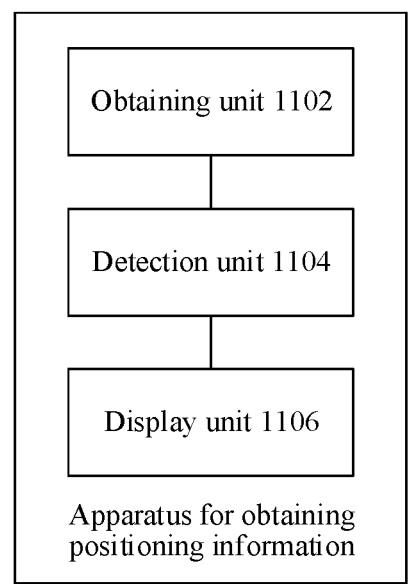
FIG. 11 is a schematic structural diagram of an optional positioning information prompting apparatus according to an embodiment of this application.

According to another aspect of the embodiments of this application, a positioning information prompting apparatus configured to perform the foregoing positioning information prompting method is further provided. As shown in FIG. 11, the apparatus includes:

(1) an obtaining unit 1102, configured to obtain a first position of a first virtual character controlled by an application client in a virtual scene;

(2) a detection unit 1104, configured to detect, in a sound source detection range corresponding to the first position, a sound signal generated in the virtual scene; and (3) a display unit 1106, configured to display positioning information of a sound source of the sound signal in the application client, in a case that the sound signal is detected in the sound source detection range, the positioning information including a position mark, used for marking, in the virtual scene, a second position of the sound source relative to the first virtual character.

According to this embodiment, by obtaining a first position of a first virtual character controlled by an application client in a virtual scene; detecting, in a sound source detection range corresponding to the first position, a sound signal generated in the virtual scene; and displaying positioning information of a sound source of the sound signal in the application client, in a case that the sound signal is detected in the sound source detection range, the positioning information including a position mark, used for marking, in the virtual scene, a second position of the sound source, the accuracy of improving the positioning information of the sound source can be improved, thereby resolving the problem in the related art that the accuracy of the obtained positioning information of the object making the sound is low.

In one embodiment, the foregoing display unit includes: an obtaining module, configured to obtain, from the sound signal, a sound source type of the sound source of the sound signal; and a first display module, configured to display the position mark corresponding to the sound source type, the position mark including a direction mark used for indicating a direction of movement of the sound source relative to the first virtual character.

The foregoing sound source may not only be a game object controlled by another user, but also may be any game object that can make a sound, such as a car, an airplane, an air-drop, a land mine, or a grenade.

The foregoing arrow indicating the direction of movement of the game object is merely an optional example. Another method may also be used for indicating a direction of movement of a game object. For example, different graphic marks and color marks may be used for indicating a direction of movement of a game object, and a direction in a deep color indicates a direction of movement of a game object, and the like.

According to this embodiment, by simultaneously displaying the positioning information of the sound source according to the sound source type and displaying the direction of movement of the sound source relative to the first virtual character, the accuracy of a display position of the sound source is improved.

In one embodiment, the foregoing first display module includes at least one of the following: a first display sub-module, configured to display, at the second position of the sound source, the position mark according to a color corresponding to the sound source type; a second display sub-module, configured to display, at the second position of the sound source, the position mark according to a shape corresponding to the sound source type; or a third display sub-module, configured to display, at the second position of the sound source, the position mark according to an identifier corresponding to the sound source type.

The foregoing position mark being an identifier, a color or a shape is merely an optional example. A specific position mark may be any color, any pattern or a combination thereof.

According to this embodiment, by providing different position identifiers for different sound source types, different sound source types can be distinguished, to improve the accuracy of displaying a position mark of a sound source.

In one embodiment, the foregoing apparatus further includes: a determining unit, configured to: before the detecting of the sound signal generated in the virtual scene, determine, according to a preset sound source type, a detection radius of the sound source detection range with the first position as a circle center, the detection radius being inversely proportional to an audio frequency indicated by the preset sound source type.

A detection radius of a sound source detection range of the first virtual character varies with a sound source type. It may be set that, a smaller frequency of a sound indicated by a sound source type indicates a larger detection radius of the sound source detection range.

In this embodiment, by setting different detection radiuses of detection ranges according to different sound source types, the process of detecting the sound source is closer to the real life, thereby further improving the accuracy of displaying a sound source.

In one embodiment, the foregoing display unit further includes one of the following: a second display module, configured to simultaneously display, in a case that a plurality of sound signals in different directions of the first virtual character are detected in the sound source detection range, position marks corresponding to respective sound sources of the plurality of sound signals; or a third display module, configured to: obtain, in a case that a plurality of sound signals in the same direction of the first virtual character are detected in the sound source detection range, display cycles respectively corresponding to sound sources of the plurality of sound signals; and determine a target sound source according to the display cycles, and display the position mark of the target sound source.

According to this embodiment, by simultaneously displaying the position marks of the sound sources in different directions, the accuracy of displaying the position mark of the sound source can be improved.

In one embodiment, the foregoing third display module is configured to: determine the target sound source in the following manner, in a case that a first display start time of the display cycle of a first sound source is earlier than a second display start time of the display cycle of a second sound source.

The third display module includes a first determining sub-module, configured to determine, in a case that the first display start time of the display cycle of the first sound source is earlier than the second display start time of the display cycle of the second sound source and a first display end time of the display cycle of the first sound source is not reached, the first sound source as the target sound source, the first sound source and the second sound source being two different sound sources among the sound sources of the plurality of sound signals; a second determining sub-module, configured to determine, in a case that the first display start time of the display cycle of the first sound source is earlier than the second display start time of the display cycle of the second sound source and the first display end time of the display cycle of the first sound source is reached but a second display end time of the display cycle of the second sound source is not reached, the second sound source as the target sound source; and a third determining sub-module, configured to determine, in a case that the first display start time of the display cycle of the first sound source is earlier than the second display start time of the display cycle of the second sound source, the first display end time of the display cycle of the first sound source is not reached, a display time length of the position mark of the first sound source is greater or equal to a first threshold, and the second display end time of the display cycle of the second sound source is not reached, the first sound source and the second sound source as alternating target sound sources at predetermined time intervals.

According to this embodiment, by sequentially or periodically displaying the position marks of different sound sources in the same direction, an objective that even a plurality of sound sources are at the same position, position marks thereof can be displayed, thereby overcoming the difficulty of complex display as well as improving the accuracy of displaying a position mark.

In one embodiment, the foregoing display unit further includes: a first adjustment module, configured to increase a display size of the position mark of the sound source, in a case that a distance between the second position of the sound source and the first position of the first virtual character is decreased; and a second adjustment module, configured to decrease the display size of the position mark of the sound source, in a case that the distance between the second position of the sound source and the first position of the first virtual character is increased.

A color may also be used for indicating the distance between the first virtual object and the sound source. For example, a deeper color of a position mark that is of a sound source and that is displayed on a client indicates a shorter distance.

According to this embodiment, by determining the size of the position mark according to the distance between a sound source and the first virtual object, the accuracy of displaying a position mark of the sound source can be improved.

In one embodiment, the foregoing display unit further includes at least one of the following: a fourth display module, configured to display, in a mission map corresponding to the virtual scene, the position mark of the sound source of the sound signal; or a fifth display module, configured to display, in a human-computer interface configured to display the virtual scene, the position mark of the sound source of the sound signal.

The position mark may be displayed only in the map in the client, the position mark may be displayed only outside the map on the client, or the position mark may be displayed both in the map and outside the map in the client.

According to this embodiment, by displaying the position mark of the sound source in the map in the client or displaying the position mark of the sound source outside the map, the flexibility of displaying a sound source is improved when the accuracy of displaying the sound source is improved.

In one embodiment, the foregoing display unit further includes: a sixth display module, configured to display the position mark of the sound source of the sound signal, according to the display cycle corresponding to a sound source type of the sound source of the sound signal.

According to this embodiment, by setting different display cycles of position marks for different sound source types, the accuracy of displaying a position mark of a sound source is improved.

Figure 12:
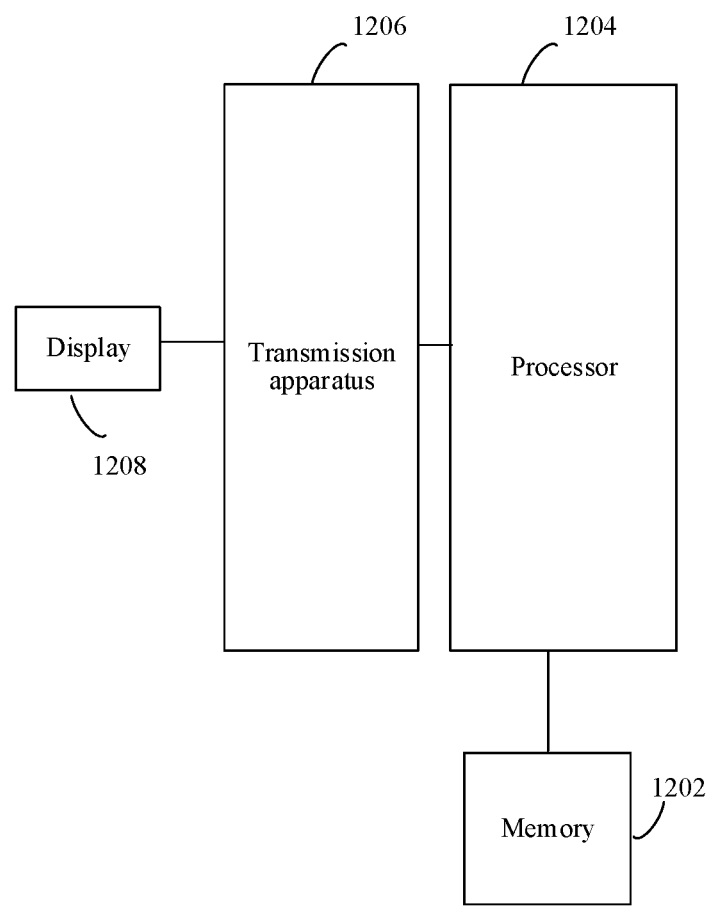
FIG. 12 is a schematic structural diagram of an optional electronic device according to an embodiment of this application.

According to still another aspect of the embodiments of this application, an electronic device configured to implement the foregoing positioning information prompting method is further provided. As shown in FIG. 12, the electronic device includes a memory and a processor, the memory storing a computer program, and the processor being configured to perform steps in any one of the foregoing method embodiments by using the computer program.

In some embodiments, the foregoing electronic device may be located in at least one of a plurality of network devices in a computer network.

In some embodiments, the processor may be configured to perform the following steps by using the computer program.

S1: Obtain a first position of a first virtual character controlled by an application client in a virtual scene.

S2: Detect, in a sound source detection range corresponding to the first position, a sound signal generated in the virtual scene.

S3: Display positioning information of the sound source of the sound signal in the application client, in a case that the sound signal is detected in the sound source detection range, the positioning information including a position mark, used for marking, in the virtual scene, a second position of the sound source relative to the first virtual character.

In some embodiments, a person of ordinary skill in the art may understand that, the structure shown in FIG. 12 is only illustrative. The electronic device may alternatively be a terminal device such as a smartphone (for example, an Android mobile phone or an iOS mobile phone), a tablet computer, a palmtop computer, a mobile Internet device (MID), or a portable Android device (PAD). FIG. 12 does not constitute a limitation on a structure of the foregoing electronic device. For example, the electronic device may further include more or fewer components (such as a network interface and a display apparatus) than those shown in FIG. 12, or have a configuration different from that shown in FIG. 12.

The memory 1202 may be configured to store a software program and module, such as a program instruction/module corresponding to the functions of the positioning information prompting method and apparatus in the embodiments of this application. The processor 1204 runs the software program and module stored in the memory 1202, to perform different functional applications and data processing, that is, implement the positioning information prompting method described above. In some embodiments, a module may refer to one or more software components or software and hardware components, that can be execute by one or more processors or implement one or more functions the positioning information prompting method and apparatus. The memory 1202 may include a high-speed random memory, and may also include a nonvolatile memory such as one or more magnetic storage devices, a flash memory, or another nonvolatile solid-state memory. In some examples, the memory 1202 may further include memories remotely disposed relative to the processor 1204, and these remote memories may be connected to a terminal through a network. Instances of the network include, but are not limited to, the Internet, an intranet, a local area network, a mobile communications network, and a combination thereof.

The transmission apparatus 1206 is configured to receive or send data through a network. Specific instances of the foregoing network may include a wired network and a wireless network. In an example, the transmission apparatus 1206 includes a network interface controller (NIC). The NIC may be connected to another network device and a router by using a network cable, to communicate with the Internet or the local area network. In an example, the transmission apparatus 1206 is a radio frequency (RF) module, configured to communicate with the Internet in a wireless manner.

Specifically, the memory 1202 is configured to store a position mark of a sound source, a sound source type, and other content.

According to still another aspect of the embodiments of this application, a storage medium is further provided. The storage medium stores a computer program, the computer program being configured to perform, during operations, steps in any one of the foregoing method embodiments.

In some embodiments, the storage medium may be configured to store a computer program used for performing the following steps:

S1: Obtain a first position of a first virtual character controlled by an application client in a virtual scene.

S2: Detect, in a sound source detection range corresponding to the first position, a sound signal generated in the virtual scene.

S3: Display positioning information of a sound source of the sound signal in the application client, in a case that the sound signal is detected in the sound source detection range, the positioning information including a position mark, used for marking, in the virtual scene, a second position of the sound source relative to the first virtual character In some embodiments, the storage medium may be configured to store a computer program used for performing the following steps:

S1: Obtain, from the sound signal, a sound source type of the sound source of the sound signal.

S2: Display the position mark corresponding to the sound source type, the position mark including a direction mark used for indicating a direction of movement of the sound source relative to the first virtual character.

In some embodiments, the storage medium may be configured to store a computer program used for performing the following steps:

S1: Display, at the second position of the sound source, the position mark according to a color corresponding to a sound source type.

S2: Display, at the second position of the sound source, the position mark according to a shape corresponding to the sound source type.

S3: Display, at the second position of the sound source, the position mark according to an identifier corresponding to the sound source type.

In some embodiments, the storage medium may be configured to store a computer program used for performing the following steps:

S1: Determine, according to a preset sound source type, a detection radius of a sound source detection range with the first position as a circle center, the detection radius being inversely proportional to an audio frequency indicated by the preset sound source type.

In some embodiments, the storage medium may be configured to store a computer program used for performing the following steps:

S1: Simultaneously display, in a case that a plurality of sound signals in different directions of the first virtual character are detected in the sound source detection range, position marks corresponding to respective sound sources of the plurality of sound signal.

S2: Obtain, in a case that a plurality of sound signals in the same direction of the first virtual character are detected in the sound source detection range, display cycles respectively corresponding to sound sources of the plurality of sound signals; and determine a target sound source according to the display cycles, and display the position mark of the target sound source.

In some embodiments, the storage medium may be configured to store a computer program used for performing the following steps:

S1: Determine the first sound source as the target sound source, in a case that a first display end time of the display cycle of the first sound source is not reached.

S2: Determine the second sound source as the target sound source, in a case that the first display end time of the display cycle of the first sound source is reached but a second display end time of the display cycle of the second sound source is not reached.

S3: Determine the first sound source and the second sound source as alternating target sound sources at predetermined time intervals, in a case that the first display end time of the display cycle of the first sound source is not reached, a display time length of the position mark of the first sound source is greater or equal to a first threshold, and the second display end time of the display cycle of the second sound source is not reached.

The first sound source and the second sound source are two different sound sources among the sound sources of the plurality of sound signals, and a first display start time of the display cycle of the first sound source is earlier than a second display start time of the display cycle of the second sound source.

In some embodiments, the storage medium may be configured to store a computer program used for performing the following steps: simultaneously displaying, in a case that a plurality of sound signals are detected in the sound source detection range and sound sources of the plurality of sound signals are in different directions of the first virtual character, respective position marks of the sound sources of the plurality of sound signals; or sequentially displaying, in a case that a plurality of sound signals are detected in the sound source detection range and sound sources of the plurality of sound signals are in the same direction of the first virtual character, a position mark of one sound source among the plurality of sound sources at predetermined time intervals.

In some embodiments, the storage medium may be configured to store a computer program used for performing the following steps:

S1: Increase a display size of the position mark of the sound source, in a case that a distance between the second position of the sound source and the first position of the first virtual character is decreased.

S2: Decrease the display size of the position mark of the sound source, in a case that the distance between the second position of the sound source and the first position of the first virtual character is increased.

In some embodiments, the storage medium may be configured to store a computer program used for performing the following steps.

S1: Display, in a mission map corresponding to the virtual scene, the position mark of the sound source of the sound signal.

S2: Display, in a human-computer interface configured to display the virtual scene, the position mark of the sound source of the sound signal.

In some embodiments, the storage medium may be configured to store a computer program used for performing the following steps.

S1: Display the position mark of the sound source of the sound signal according to the display cycle corresponding to the sound source type of the sound source of the sound signal.

In some embodiments, the storage medium may be configured to store a computer program used for performing the following steps: detecting, by using a signal receiver deployed in a plurality of orientations and in the sound source detection range corresponding to the first position, the sound signal generated in a virtual scene.

According to still another aspect of the embodiments of this application, a computer program product including an instruction is provided, the computer program product, when executed on a computer, causing the computer to perform the positioning information prompting method according to this application.

In some embodiments, a person of ordinary skill in the art may understand that all or some of the steps of the methods in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, a compact disc, and the like.

The sequence numbers of the foregoing embodiments of this application are merely for description purpose, and do not indicate the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions in this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is to be understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the units or modules may be implemented in an electronic form or another form.

The units described as separate components may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make improvements and modifications without departing from the principle of this application, and all such improvements and modifications fall in the protection scope of this application.

What is claimed is:

1. A positioning information prompting method, applied to an electronic device, the method comprising:
   obtaining a position of a virtual character controlled by an application client in a virtual scene;
   detecting, in a sound source detection range corresponding to the position, a first sound signal and a second sound signal generated in the virtual scene; and
   in response to determining that the first sound signal and the second sound signal are detected in the sound source detection range, obtaining a display cycle corresponding to a first sound source of the first sound signal and a display cycle corresponding to a second sound source of the second sound signal, the first sound source being different than the second sound source; and
   determining and displaying a target sound source, in response to determining that a first display start time of the display cycle of the first sound source is earlier than a second display start time of the display cycle of the second sound source, wherein the target sound source is determined and displayed by:
   determining the first sound source is the target sound source and displaying the first sound source, in response to determining that a first display end time of the display cycle of the first sound source is not reached;
   determining the second sound source is the target sound source and displaying the second sound source, in response to determining that the first display end time of the display cycle of the first sound source is reached and a second display end time of the display cycle of the second sound source is not reached; and
   determining the first sound source and the second sound source alternate as the target sound source and sequentially displaying the first sound source and the second sound source at predetermined time intervals, in response to determining that the first display end time of the display cycle of the first sound source is not reached, a display time length of a position mark of the first sound source is greater or equal to a threshold, and the second display end time of the display cycle of the second sound source is not reached.

2. The method according to claim 1, further comprising:
   obtaining, from the first sound signal, a first sound source type of the first sound source of the first sound signal;
   displaying the position mark corresponding to the first sound source type, the position mark comprising a direction mark used for indicating a direction of movement of the first sound source relative to the virtual character.

3. The method according to claim 1, further comprising at least one of:
- displaying, at a position of the first sound source, the position mark according to a color corresponding to the first sound source type;
- displaying, at the position of the first sound source, the position mark according to a shape corresponding to the first sound source type; or
- displaying, at the position of the first sound source, the position mark according to an identifier corresponding to the first sound source type.

4. The method according to claim 1, further comprising:
- determining, according to a preset sound source type, a detection radius of the sound source detection range with the first position as a circle center, the detection radius being inversely proportional to an audio frequency indicated by the preset sound source type.

5. The method according to claim 1, further comprising:
- simultaneously displaying the position mark of the first sound source and a position mark of the second sound source in response to determining the first sound signal and the second sound signal are in different directions of the virtual.

6. The method according to claim 1, further comprising at least one of:
- increasing a display size of the position mark of the first sound source, in response to determining that a distance between a position of the first sound source and the position of the virtual character is decreased; or
- decreasing the display size of the position mark of the first sound source, in response to determining that the distance between the position of the first sound source and the position of the virtual character is increased.

7. The method according to claim 1, wherein the position mark of the first sound source is displayed by at least one of:
- displaying, in a mission map corresponding to the virtual scene, the position mark of the first sound source of the first sound signal; or
- displaying, in a human-computer interface configured to display the virtual scene, the position mark of the first sound source of the first sound signal.

8. The method according to claim 1, wherein the position mark of the first sound source of the first sound signal is displayed according to the display cycle corresponding to a sound source type of the first sound source of the first sound signal.

9. The method according to claim 1, wherein the first sound signal is generated by:
- detecting, by using a signal receiver deployed in a plurality of orientations and in the sound source detection range corresponding to the position of the virtual character, the first sound signal.

10. A positioning information prompting apparatus, comprising: a memory; and a processor coupled to the memory and configured to:
- obtain a position of a virtual character controlled by an application client in a virtual scene;
- detect, in a sound source detection range corresponding to the position, a first sound signal and a second sound signal generated in the virtual scene; and
- in response to determining that the first sound signal and the second sound signal are detected in the sound source detection range, obtain a display cycle corresponding to a first sound source of the first sound signal and a display cycle corresponding to a second sound source of the second sound signal, the first sound source being different than the second sound source; and
- determine and display a target sound source, in response to determining that a first display start time of the display cycle of the first sound source is earlier than a second display start time of the display cycle of the second sound source, wherein the target sound source is determined and displayed by:
  - determining the first sound source is the target sound source and displaying the first sound source, in response to determining that a first display end time of the display cycle of the first sound source is not reached;
  - determining the second sound source is the target sound source and displaying the second sound source, in response to determining that the first display end time of the display cycle of the first sound source is reached and a second display end time of the display cycle of the second sound source is not reached; and
  - determining the first sound source and the second sound source alternate as the target sound source and sequentially displaying the first sound source and the second sound source at predetermined time intervals, in response to determining that the first display end time of the display cycle of the first sound source is not reached, a display time length of a position mark of the first sound source is greater or equal to a threshold, and the second display end time of the display cycle of the second sound source is not reached.

11. The apparatus according to claim 10, wherein the processor is further configured to:
- obtain, from the first sound signal, a first sound source type of the first sound source of the first sound signal;
- display the position mark corresponding to the first sound source type, the position mark comprising a direction mark used for indicating a direction of movement of the first sound source relative to the virtual character.

12. The apparatus according to claim 11, wherein the processor is further configured to:
- determine, according to a preset sound source type, a detection radius of the sound source detection range with the first position as a circle center, the detection radius being inversely proportional to an audio frequency indicated by the preset sound source type.

13. The apparatus according to claim 9, wherein the processor is further configured to perform at least one of:
- displaying, at a position of the first sound source, the position mark according to a color corresponding to the first sound source type;
- displaying, at the position of the first sound source, the position mark according to a shape corresponding to the first sound source type; or
- displaying, at the position of the first sound source, the position mark according to an identifier corresponding to the first sound source type.

14. The apparatus according to claim 10, wherein the processor is further configured to perform at least one of:
- increasing a display size of the position mark of the first sound source, in response to determining that a distance between a position of the first sound source and the position of the virtual character is decreased; or
- decreasing the display size of the position mark of the first sound source, in response to determining that the distance between the position of the first sound source and the position of the virtual character is increased.

15. The apparatus according to claim 10, wherein the position mark of the first sound source is displayed by at least one of:
- displaying, in a mission map corresponding to the virtual scene, the position mark of the first sound source of the first sound signal; or
- displaying, in a human-computer interface configured to display the virtual scene, the position mark of the first sound source of the first sound signal.

16. The apparatus according to claim 10, wherein the first sound signal and the second sound signal are displayed further by:
- simultaneously displaying the position mark of the first sound source and a position mark of the second sound source in response to determining the first sound signal and the second sound signal are in different directions of the virtual character.

17. A non-transitory storage medium, storing a computer program, the computer program being configured to perform, when executed by one or more processors, a method comprising:
- obtaining a position of a virtual character controlled by an application client in a virtual scene;
- detecting, in a sound source detection range corresponding to the position, a first sound signal and a second sound signal generated in the virtual scene; and
- in a case in response to determining that the first sound signal and the second sound signal are detected in the sound source detection range, obtaining a display cycle corresponding to a first sound source of the first sound signal and a display cycle corresponding to a second sound source of the second sound signal, the first sound source being different than the second sound source; and
- determining and displaying a target sound source, in response to determining that a first display start time of the display cycle of the first sound source is earlier than a second display start time of the display cycle of the second sound source, wherein the target sound source is determined and displayed by:
  - determining the first sound source is the target sound source and displaying the first sound source, in response to determining that a first display end time of the display cycle of the first sound source is not reached;
  - determining the second sound source is the target sound source and displaying the second sound source, in response to determining that the first display end time of the display cycle of the first sound source is reached and a second display end time of the display cycle of the second sound source is not reached; and
  - determining the first sound source and the second sound source alternate as the target sound source and sequentially displaying the first sound source and the second sound source at predetermined time intervals, in response to determining that the first display end time of the display cycle of the first sound source is not reached, a display time length of a position mark of the first sound source is greater or equal to a threshold, and the second display end time of the display cycle of the second sound source is not reached.

18. The non-transitory storage medium according to claim 17, wherein the first sound signal and the second sound signal are displayed further by:
- simultaneously displaying the position mark of the first sound source and a position mark of the second sound source in response to determining the first sound signal and the second sound signal are in different directions of the virtual character.

19. The non-transitory storage medium according to claim 17, wherein the method further comprises:
- displaying, at a position of the first sound source, the position mark according to a color corresponding to the first sound source type;
- displaying, at the position of the first sound source, the position mark according to a shape corresponding to the first sound source type; or
- displaying, at the position of the first sound source, the position mark according to an identifier corresponding to the first sound source type.

* * * * *